(12) United States Patent
Shen et al.

(10) Patent No.: US 12,347,138 B2
(45) Date of Patent: Jul. 1, 2025

(54) VISUAL POSITIONING BASED ON A PLURALITY OF IMAGE FRAMES

(71) Applicant: Beijing Sankuai Online Technology Co., Ltd., Beijing (CN)

(72) Inventors: Hao Shen, Beijing (CN); Qiong Nie, Beijing (CN); Huaxia Xia, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 401 days.

(21) Appl. No.: 17/799,900

(22) PCT Filed: Nov. 16, 2020

(86) PCT No.: PCT/CN2020/129070
§ 371 (c)(1),
(2) Date: Aug. 15, 2022

(87) PCT Pub. No.: WO2021/169420
PCT Pub. Date: Sep. 2, 2021

(65) Prior Publication Data
US 2023/0100776 A1    Mar. 30, 2023

(30) Foreign Application Priority Data
Feb. 27, 2020   (CN) .......................... 202010124712.X (51) Int. Cl.
*G06T 7/73*       (2017.01)
*G01C 21/16*     (2006.01)
*G06T 7/00*       (2017.01)

(52) U.S. Cl.
CPC .............. *G06T 7/74* (2017.01); *G01C 21/165* (2013.01); *G06T 7/0002* (2013.01); *G06T 2207/10016* (2013.01); *G06T 2207/30168* (2013.01)

(58) Field of Classification Search
None
See application file for complete search history.

(56) References Cited

U.S. PATENT DOCUMENTS 7,860,273 B2    12/2010   Kochi et al.
11,270,460 B2 *  3/2022   Qiao .......................... G06T 7/74
(Continued)

FOREIGN PATENT DOCUMENTS

CN     106447585 A    2/2017
CN     106949881 A    7/2017
(Continued)

OTHER PUBLICATIONS

State Intellectual Property Office of the People's Republic of China, Office Action and Search Report Issued in Application No. 202010124712X, Feb. 8, 2021, 10 pages. (Submitted with Machine/Partial Translation).

(Continued)

*Primary Examiner* — Vikkram Bali
(74) *Attorney, Agent, or Firm* — Kilpatrick Townsend & Stockton LLP (57)    ABSTRACT

A visual positioning method and apparatus are provided. In some embodiments, the method includes: acquiring a video captured by an image sensor; determining visual positioning information respectively corresponding to a plurality of key image frames in the video; determining a capture pose transformation relationship between each of the plurality of key image frames according to inertial navigation information of the image sensor recorded when taking the video; performing, according to the visual positioning information corresponding to each of the plurality of key image frames, graph optimization processing on the visual positioning information corresponding to each of the plurality of key image frames by using the capture pose transformation relationship between each of the plurality of key image (Continued)

frames as an edge constraint; and determining, according to a result of the graph optimization processing, a visual positioning result of the image sensor when taking the video.

12 Claims, 3 Drawing Sheets

(56) References Cited

U.S. PATENT DOCUMENTS

| | | | |
|---|---|---|---|
| 2007/0165107 | A1 | 7/2007 | Trulaske |
| 2008/0095402 | A1 | 4/2008 | Kochi et al. |
| 2019/0346271 | A1* | 11/2019 | Zhang ............... G05D 1/245 |
| 2020/0047340 | A1* | 2/2020 | Hong ............... G01S 17/894 |
| 2021/0272372 | A1* | 9/2021 | Heinen ............... G06T 7/593 |

FOREIGN PATENT DOCUMENTS

| | | | |
|---|---|---|---|
| CN | 108460779 A | 8/2018 | |
| CN | 108492316 A | 9/2018 | |
| CN | 109166149 A | 1/2019 | |
| CN | 110017841 A | 7/2019 | |
| CN | 110108258 A | 8/2019 | |
| CN | 110118554 A | 8/2019 | |
| CN | 110335317 A | 10/2019 | |
| CN | 111238450 A | 6/2020 | |
| EP | 1906140 A2 | 4/2008 | |
| WO | WO-2020155616 A1 * | 8/2020 | ........... G01C 21/165 |

OTHER PUBLICATIONS

State Intellectual Property Office of the People's Republic of China, Office Action and Search Report Issued in Application No. 202010124712X, Jun. 4, 2021, 9 pages. (Submitted with Machine/Partial Translation).

ISA State Intellectual Property Office of the People's Republic of China, International Search Report Issued in Application No. PCT/CN2020/129070, Feb. 19, 2021, WIPO, 4 pages.

* cited by examiner

VISUAL POSITIONING BASED ON A PLURALITY OF IMAGE FRAMES

CROSS REFERENCE TO RELATED APPLICATION

This application is a US National Phase of a PCT Application No. PCT/CN2020/129070, filed on Nov. 16, 2020, which claims priority to Chinese application No. 202010124712.X, filed on Feb. 27, 2020, entitled "VISUAL POSITIONING BASED ON A PLURALITY OF IMAGE FRAMES", the contents of which are incorporated herein by reference in their entireties.

TECHNICAL FIELD

The present disclosure relates to the field of visual positioning technologies, and in particular, to visual positioning based on a plurality of image frames.

BACKGROUND

At present, with the continuous development of the technology, a visual positioning technology based on machine vision is increasingly widely used in unmanned driving, intelligent wear and other fields. Using the field of the unmanned driving as an example, unmanned devices can be positioned using the visual positioning technology when positioning is lost.

SUMMARY

Various embodiments provide a visual positioning method and apparatus. The method includes: acquiring a video captured by an image sensor; determining visual positioning information respectively corresponding to a plurality of key image frames in the video; determining a capture pose transformation relationship between each of the plurality of key image frames according to inertial navigation information of the image sensor recorded when taking the video; performing, according to the visual positioning information corresponding to each of the plurality of key image frames, graph optimization processing on the visual positioning information corresponding to each of the plurality of key image frames by using the capture pose transformation relationship between each of the plurality of key image frames as an edge constraint; and determining, according to a result of the graph optimization processing, a visual positioning result of the image sensor when taking the video.

In some embodiments, determining the visual positioning information respectively corresponding to the plurality of key image frames in the video includes: determining content information of each image frame in the video; selecting at least three key image frames that satisfy a preset condition from the video according to the content information of each image frame; and determining the visual positioning information corresponding to each of the at least three key image frames.

In some embodiments, selecting the at least three key image frames that satisfy the preset condition from the video according to the content information of each image frame includes: determining a selection indicator according to the content information of each image frame, the selection indicator including at least one of: a content repeatability between each pair of two image frames, a content richness of each image frame, or image quality of each image frame; and selecting the at least three key image frames from the video according to the selection indicator.

In some embodiments, the selection indicator is the content repeatability between each pair of two image frames, and determining the selection indicator according to the content information of each image frame includes: for each pair of two image frames, comparing the two image frames, and determining an image content overlapping region between the two image frames according to the comparison result; and determining a content repeatability of the two image frames according to the image content overlapping region.

In some embodiments, the video includes a first image frame, the selection indicator is the content richness of each image frame, and determining the selection indicator according to the content information of each image frame includes: determining the content richness of the first image frame according to at least one of: a gradient, a texture, or a quantity of feature points of the first image frame.

In some embodiments, the video includes a second image frame, the selection indicator is the image quality of each image frame, and determining the selection indicator according to the content information of each image frame includes: determining the image quality of the second image frame according to at least one of: a gradient, a brightness, or a sharpness of the second image frame.

In some embodiments, the video includes a third image frame, and selecting the at least three key image frames that satisfy a preset condition from the video according to the content information of each image frame includes: selecting the third image frame as one of the at least three key image frames when a content repeatability between the third image frame and other image frames in the video is less than a preset content repeatability threshold, and/or a content richness of the third image frame is greater than a preset content richness threshold, and/or image quality of the third image frame is greater than a preset image quality threshold.

In some embodiments, performing, according to the visual positioning information corresponding to each of the plurality of key image frames, the graph optimization processing on the visual positioning information corresponding to each of the plurality of key image frames by using the capture pose transformation relationship between each of the key image frames as the edge constraint includes: determining, in an electronic map, a local position region in which the image sensor is located according to the capture pose transformation relationship between each of the plurality of key image frames and the visual positioning information corresponding to each of the plurality of key image frames; determining updated visual positioning information of each of the plurality of key image frames relative to the local position region; determining at least one key image frame in the local position region according to the updated visual positioning information of each of the plurality of key image frames, and determining updated visual positioning information of the at least one key image frame in the local position region as to-be-determined visual positioning information; and performing graph optimization processing on the to-be-determined visual positioning information corresponding to each of the at least one key image frame in the local position region by using a capture pose transformation relationship between each of the at least one key image frame in the local position region as an edge constraint.

In some embodiments, determining, in the electronic map, the local position region in which the image sensor is located according to the capture pose transformation relationship between each of the plurality of key image frames and the visual positioning information corresponding to each of the plurality of key image frames includes: selecting a key image frame from the at least three key image frames as a reference image frame, and determining remaining key image frames as other key image frames; performing coordinate transformation on visual positioning information corresponding to the other key image frames according to capture pose transformation relationships between the other key image frames and the reference image frame, to obtain relative visual positioning information of each of the other key image frames; clustering the visual positioning information corresponding to the reference image frame and the relative visual positioning information of each of the other key image frames; selecting at least two designated key image frames from the at least three key image frames according to a clustering result; and determining, in the electronic map, the local position region in which the image sensor is located according to visual positioning information corresponding to the selected designated key image frames.

In some embodiments, performing the graph optimization processing on the to-be-determined visual positioning information corresponding to each of the at least one key image frame in the local position region by using the capture pose transformation relationship between each of the at least one key image frame in the local position region as the edge constraint includes: determining a positioning error according to the capture pose transformation relationship between each of the at least one key image frame in the local position region and the to-be-determined visual positioning information corresponding to each of the at least one key image frame in the local position region; and optimizing the to-be-determined visual positioning information corresponding to each of the at least one key image frame in the local position region by using the minimization of the positioning error as an optimization goal.

The present disclosure provides a visual positioning apparatus, and the apparatus includes:
- an acquisition module, configured to acquire a video captured by an image sensor;
- a first determining module, configured to determine visual positioning information respectively corresponding to a plurality of key image frames in the video;
- a second determining module, configured to determine a capture pose transformation relationship between each of the plurality of key image frames according to inertial navigation information of the image sensor recorded when taking the video;
- a graph optimization module, configured to perform, according to the visual positioning information corresponding to each of the plurality of key image frames, graph optimization processing on the visual positioning information corresponding to each of the plurality of key image frames by using the capture pose transformation relationship between each of the plurality of key image frames as an edge constraint; and
- a third determining module, configured to determine, according to a result of the graph optimization processing, a visual positioning result of the image sensor when taking the video.

The present disclosure provides a computer-readable storage medium storing a computer program, the computer program, when executed by a controller, causing the controller to implement the above vision positioning method.

The present disclosure provides an unmanned device, and the unmanned device includes: a processor; and a memory, configured to store an instruction executable by the processor, the instruction, when executed, causing the processor to implement the above vision positioning method.

DETAILED DESCRIPTION OF THE EMBODIMENTS

To states the objectives, technical solutions, and advantages of the present disclosure, the technical solutions of the present disclosure will be clearly and completely described below with reference to specific embodiments of the present disclosure and the accompanying drawings. Apparently, the described embodiments are some embodiments rather than all the embodiments of the present disclosure. All other embodiments obtained by a person of ordinary skill in the art based on the embodiments of the present disclosure without creative efforts shall fall within the protection scope of the present disclosure.

In a feasible implementation, a visual positioning method includes a method that can determine a visual positioning result according to a single image frame, for example, a method of positioning based on a single image frame, a method of positioning based on a deep learning model, and the like.

Due to the imprecision of the visual positioning result determined according to a single image frame, and because visual positioning results corresponding to two image frames repeatedly captured at the same position may differ significantly from each other, positioning results of an unmanned device may be unstable.

A visual positioning method according to the present disclosure may be applied to an unmanned device. When the unmanned device is started and initialized indoors, or when a positioning module such as a global positioning system (GPS) placed on the unmanned device loses the positioning, the visual positioning method according to the present disclosure may be used to determine a visual positioning result of an image sensor mounted on the unmanned device (that is, to determine the visual positioning result of the unmanned device). In addition, the positioning result of the unmanned device determined using the visual positioning method may also assist in verifying positioning information of the positioning module such as a GPS.

The visual positioning method according to the present disclosure may further be applied to smart devices such as smart phones and tablet computers. Due to the limited scope of application of the positioning module such as a GPS mounted on the smart device, for example, when a user uses the smart device for positioning, especially indoors, it is not possible to obtain a precise positioning result using the positioning module on the smart device, and the visual positioning method according to the present disclosure may be used to determine the visual positioning result of the smart device according to a video and inertial navigation information.

The visual positioning method according to the present disclosure may also be applied to wearable devices with image sensors but without positioning modules such as a GPS, for example, sports helmets with cameras. When the user is holding the wearable device for positioning, the visual positioning method may be used to determine the visual positioning result of the image sensor mounted on the wearable device.

The following describes the technical solution according to each embodiment of the present disclosure in detail with reference to the accompanying drawings.

Figure 1:
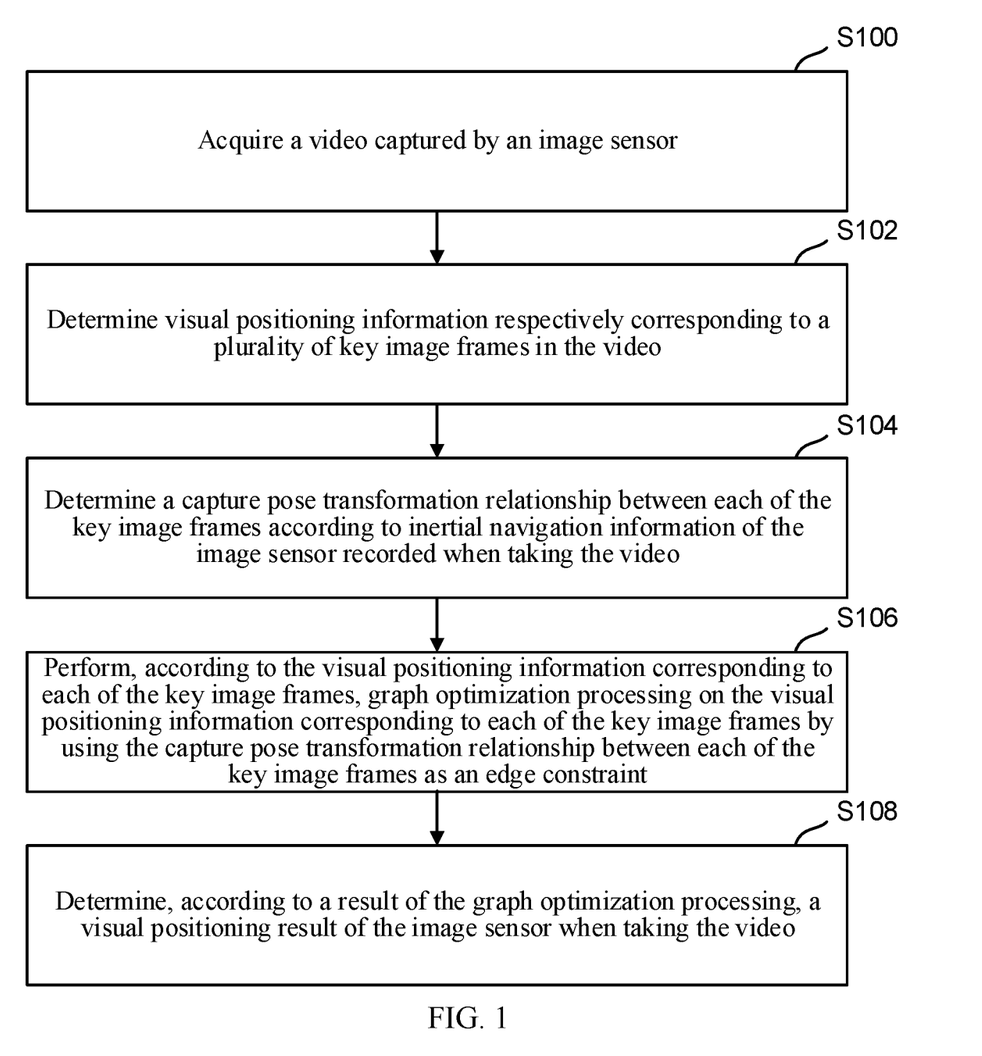
FIG. 1 is an exemplary flowchart of a visual positioning method.

FIG. 1 is a flowchart of a visual positioning method according to an embodiment of the present disclosure, which may specifically include the following steps S100 to S108.

S100: A video captured by an image sensor is acquired.

The visual positioning method according to the present disclosure may first acquire the video captured by the image sensor. When the unmanned device uses the visual positioning method for positioning, a video may be automatically taken by the image sensor for a period of time while the unmanned device is traveling, or the image sensor may be automatically rotated and the video may be taken while the unmanned device is stationary. When the user uses the smart device or the wearable device for positioning, software installed on the smart device or the wearable device may initiate positioning through human-computer interaction, the smart device or the wearable device is rotated around, and the video is taken using the image sensor mounted on the smart device or the wearable device.

In addition, when the image sensor is used to take the video, inertial navigation information measured by an inertial measurement unit (IMU) can further be recorded simultaneously. The inertial navigation information may include rotational angle, displacement and other information.

S102: Visual positioning information respectively corresponding to a plurality of key image frames in the video is determined.

In some examples, after acquiring the video captured by the image sensor, the visual positioning information corresponding to each image frame in the acquired video may be determined according to a pre-stored electronic map. Due to overlapping regions of content and different image quality levels of each image frame in the video and the like when the image sensor takes the video, a quantity of key image frames may be selected from each image frame that constitutes the video, and visual positioning information corresponding to each key image frame may be determined. The visual positioning information may be coordinates in an electronic map.

In some examples, that determining visual positioning information respectively corresponding to a plurality of key image frames in the video includes: determining content information of each image frame in the video; selecting at least three key image frames that satisfy a preset condition from the video according to the content information of each image frame; and determining the visual positioning information corresponding to each key image frame.

In some examples, that selecting at least three key image frames that satisfy a preset condition from the video according to the content information of each image frame includes: determining a selection indicator according to the content information of each image frame, the selection indicator including at least one of a content repeatability between image frames, a content richness of each image frame, or image quality of each image frame; and selecting the key image frames from the video according to the selection indicator.

In some examples, the selection indicator is the content repeatability between each pair of two image frames, and that determining a selection indicator according to the content information of each image frame includes: for each pair of two image frames, comparing the two image frames, and determining an image content overlapping region between the two image frames according to the comparison result; and determining a content repeatability of the two image frames according to the image content overlapping region. The content repeatability characterizes a proportion of an image content repeating region of the two image frames in the image content. The larger the image content repeating region, the greater the proportion of the image content repeating region in the image frame, and the greater the content repeatability of the image frame with other image frames; conversely, the smaller the content repeatability of the image frame with other image frames.

In some examples, the video includes a first image frame, the selection indicator is the content richness of each image frame, and that determining a selection indicator according to the content information of each image frame includes: determining a content richness of the first image frame according to at least one of: a gradient, a texture, or a quantity of feature points of the first image frame. The content richness characterizes changes of the gradient and texture, and the quantity of the feature points in an image. The more obvious the changes of the gradient and texture in the image frame, and/or the more the quantity of the feature points in the image frame, the greater the content richness of the image frame; the less obvious the changes of the gradient and texture in the image frame, and/or the less the quantity of the feature points, the smaller the content richness of the image frame. For example, if the content of the first image frame is a pure white wall and the content of a second image frame is a landscape painting, a content richness of the second image frame is greater than the content richness of the first image frame.

In some examples, the video includes a second image frame, the selection indicator is the image quality of each image frame, and that determining a selection indicator according to the content information of each image frame includes: determining image quality of the second image frame according to at least one of: a gradient, a brightness, or a sharpness of the second image frame. The image quality characterizes a difference between the content of the image and an actual environment. The more obvious the gradient of the image and the greater the sharpness of the image, the higher the image quality; the brighter or darker the brightness of the image, the lower the image quality. That is, the greater the difference between the content of the image and the actual environment, the lower the image quality; conversely, the smaller the difference between the content of the image and the actual environment, the higher the image quality.

Therefore, the video includes a third image frame, and that selecting at least three key image frames that satisfy a preset condition from the video according to the content information of each image frame includes: selecting the third image frame as the key image frame when a content repeatability between the third image frame and another image frame in the video is less than a preset content repeatability threshold, and/or a content richness of the third image frame is greater than a preset content richness threshold, and/or image quality of the third image frame is greater than a preset image quality threshold.

In determining the visual positioning information corresponding to each key image frame, a model-based single-frame image visual positioning method or a feature-point-based single-frame visual positioning method may be used to determine the visual positioning information corresponding to each key image frame according to a pre-stored electronic map. The electronic map is pre-generated according to images, point clouds, and the like. Since the method of determining the visual positioning information corresponding to a single-frame image is relatively mature, the process of determining the visual positioning information corresponding to a single-frame key image is not repeated in detail in the present disclosure.

S104: A capture pose transformation relationship between each of the key image frames is determined according to inertial navigation information of the image sensor recorded when taking the video.

In the process of capturing the video with the image sensor, the present disclosure may further collect the inertial navigation information through the IMU, and determine the capture pose transformation relationship between each of the key image frames in the process of capturing the video by the image sensor. The capture pose transformation relationship characterizes a transformation relationship between a shooting pose of the image sensor to take one image frame in the video and a shooting pose of the image sensor to take another image frame in the video. Therefore, the inertial navigation information obtained by the IMU may be considered as the inertial navigation information of the image sensor.

In addition, a motion trajectory of the image sensor from taking one image frame to taking another image frame may be determined according to the two image frames captured by the image sensor and the inertial navigation information recorded by the IMU, and the capture pose transformation relationship between the two image frames may be determined according to the determined motion trajectory.

S106: According to the visual positioning information corresponding to each of the key image frames, and by using the capture pose transformation relationship between each of the key image frames as an edge constraint, graph optimization processing on the visual positioning information corresponding to each of the key image frames is performed.

Since several key image frames are screened in the video in step S102, the capture pose transformation relationship between each of the key image frames may be used as an edge constraint to perform the graph optimization processing on the visual positioning information corresponding to each key image frame.

In some examples, first, that determining the visual positioning information corresponding to each key image frame includes: determining, in the electronic map, a local position region in which the image sensor is located.

In this embodiment, one key image frame is selected from the at least three key image frames as a reference image frame, and remaining key image frames are used as other key image frames. For each key image frame of the other key image frames, the coordinate transformation is performed on the visual positioning information corresponding to the other key image frame according to capture pose transformation relationships between the other key image frame and the reference image frame, to obtain relative visual positioning information of the other key image frame. The coordinate transformation characterizes that the visual positioning information corresponding to the key image frame is estimated as the relative visual positioning information relative to the reference image frame according to the capture pose transformation relationship between the key image frame and the reference image frame. That is, the relative visual positioning information of the key image frame relative to the reference image frame is determined according to the visual positioning information corresponding to the key image frame and the capture pose transformation relationship between the key image frame and the reference image frame. The visual positioning information corresponding to the reference image frame and the relative visual positioning information of each of the other key image frames are clustered. At least two designated key image frames are selected from the at least three key image frames according to a clustering result. The local position region in which the image sensor is located is determined in the electronic map according to the visual positioning information corresponding to the selected at least two designated key image frames.

Figure 2:
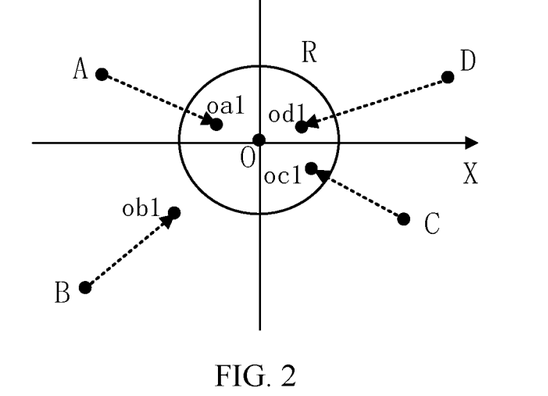
FIG. 2 is an exemplary schematic diagram of determining a local position region in which an image sensor is located.

FIG. 2 is a schematic diagram of determining a local position region in which an image sensor is located according to an embodiment of the present disclosure. In FIG. 2, a dot O, a dot A, a dot B, a dot C, and a dot D represent the visual positioning information corresponding to a key image frame. An XOY coordinate system may be established with the dot O as a coordinate origin, and a key image frame corresponding to the dot O may be used as the reference image frame. The visual positioning information represented by the dot A, dot B, dot C, and dot D respectively correspond to one other key image frame. According to the respective capture pose transformation relationship (which may be determined according to the inertial navigation information) between each key image frame in these other key image frames and the reference image frame, the dot A, dot B, dot C, and dot D are respectively subjected to the coordinate transformation to obtain visual positioning information of a dot oa1, a dot ob1, a dot oc1, and a dot od1 after coordinate transformation, that is, the relative visual positioning information of the other key image frames. The dashed arrows represent coordinate transformations. The dot oa1 represents the relative visual positioning information relative to the reference image frame determined by the coordinate transformation of the dot A according to the capture pose transformation relationship between the key image frame corresponding to the dot A and the reference image frame. Similarly, the dot ob1, dot oc1, and dot od1 are the relative visual positioning information relative to the reference image frame determined by the coordinate transformations of the dot B, dot C, and dot D. If the determined visual positioning information corresponding to each key image frame is relatively accurate, that is, positions of the dot O, dot A, dot B, dot C, and dot D are all relatively accurate, then the dot oa1, dot ob1, dot oc1, and dot od1 should be located in a designated neighborhood of the coordinate center dot O (a size of the designated neighborhood may be determined by a preset threshold). In FIG. 2, however, the dot ob1 is not located in the designated neighborhood (indicated by a circle R) of the coordinate center dot O, that is, the key image frame corresponding to the dot B gets inaccurate results when the single-frame image visual information positioning is performed. Therefore, the local position region in which the image sensor is located may be determined according to the dots corresponding to the relatively accurate visual positioning information. Then, updated visual positioning information of each key image frame relative to the local position region is determined, the key image frame located in the local position region according to the updated visual positioning information of each key image frame is determined, and the updated visual positioning information of the key image frame in the local position region is used as to-be-determined visual positioning information.

Figure 3:
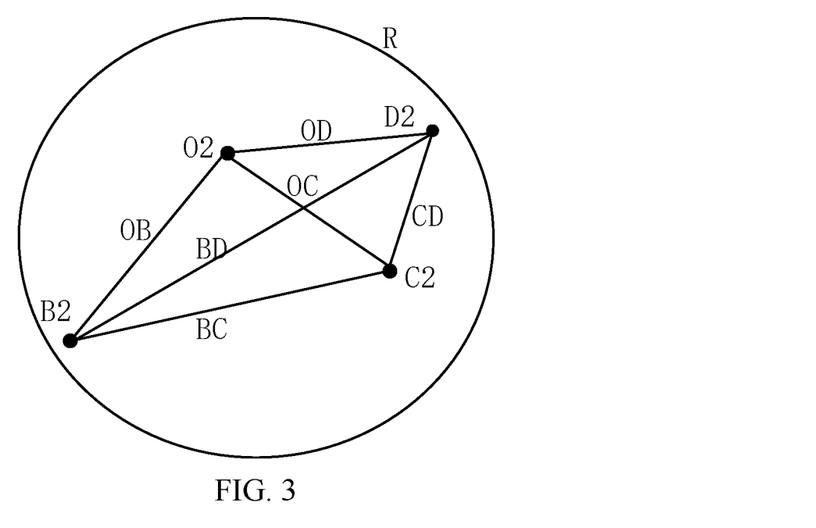
FIG. 3 is an exemplary schematic diagram of graph optimization of a to-be-determined visual positioning information corresponding to a key image frame.

Following the above example, FIG. 3 is a schematic diagram of graph optimization of a to-be-determined visual positioning information corresponding to a key image frame according to an embodiment of the present disclosure. By re-performing the single-frame visual positioning on each key image frame relative to the local position region which is the circle R, the to-be-determined visual positioning information corresponding to each key image frame is obtained. For example, the to-be-determined visual positioning information corresponding to the key image frames respectively corresponding to the dot O, dot A, dot B, dot C, and dot D may be represented as a dot O2, a dot A2 (not shown), a dot B2, a dot C2, and a dot D2. If there is at least the to-be-determined visual positioning information corresponding to three key image frames located in the local position region after repositioning, the to-be-determined visual positioning information may be subjected to the graph optimization processing; otherwise, the process returns to step S100 to re-acquire a video.

In addition, that performing the graph optimization processing on the to-be-determined visual positioning information by using the capture pose transformation relationship between each of the key image frames in the local position region as an edge constraint may include: determining a positioning error according to the capture pose transformation relationship between each of the key image frames in the local position region and the to-be-determined visual positioning information corresponding to each key image frame (for example, by means of the coordinate transformation). For example, the coordinate transformation may be performed on the to-be-determined visual positioning information corresponding to any two key image frames in the local position region according to the capture pose transformation relationship, and a positioning error between the relative visual positioning information obtained by the coordinate transformation and the corresponding to-be-determined visual positioning information may be determined. The to-be-determined visual positioning information corresponding to each key image frame is optimized by using minimization of the positioning error as an optimization goal.

Following the above example, for example, if a positioning error occurs when the single-frame visual positioning is re-performed on the key image frame corresponding to the dot A, the dot A is eliminated, and the capture pose transformation relationship between each of the key image frames in the local position region may be represented as OB, OC, OD, BC, BD, and CD. The schematic diagram shown in FIG. 3 can be obtained using the capture pose transformation relationship between each of the key image frames as an edge constraint and using the to-be-determined visual positioning information corresponding to each key image frame as a vertex. Assuming that the positioning error is F(x), the final visual positioning information after graph optimization corresponding to each key image frame in the local position region may be obtained by calculating minF(x).

S108: A visual positioning result of the image sensor when taking the video is determined according to a result of the graph optimization processing.

After performing the graph optimization processing on the to-be-determined visual positioning information corresponding to each key image frame, the final visual positioning information corresponding to each key image frame may be obtained. According to a shooting time corresponding to each key image frame when the image sensor takes the video, the final visual positioning information corresponding to a key image frame of which the shooting time is the latest may be taken as the visual positioning result when the image sensor takes the video. Since the final visual positioning information corresponding to each key image frame is relatively accurate, any one key image frame may be selected from each key image frame, and the visual positioning result of the image sensor when taking the video may be determined according to the final visual positioning information corresponding to the selected key image frame and a capture pose transformation relationship between each key image frame.

The above visual positioning method according to the present disclosure may be applied to a terminal device such as an unmanned device, a smart device, and a wearable device, as well as to a server. When the above visual positioning method is applied to the server, the video may be acquired by the terminal device and uploaded to the server through the terminal device. The server may determine the visual positioning result when the image sensor of the terminal device takes the video according to the video and the inertial navigation information, and send the visual positioning result to the terminal device.

The above visual positioning method according to the present disclosure may be applied to the field of delivery using unmanned devices, for example, a scenario of delivery using the unmanned device for express delivery, take-out, and the like. In the above scenario, a driverless fleet of a plurality of unmanned devices may be used for delivery.

Figure 4:
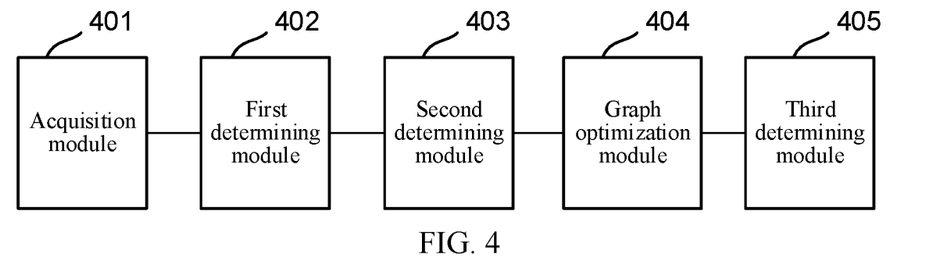
FIG. 4 is an exemplary schematic structural diagram of a visual positioning apparatus.

Based on the visual positioning method shown in FIG. 1, an embodiment of the present disclosure further correspondingly provides a visual positioning apparatus, as shown in FIG. 4.

FIG. 4 is a schematic structural diagram of a visual positioning apparatus according to an embodiment of the present disclosure. The apparatus includes:

an acquisition module 401, configured to acquire a video captured by an image sensor;

a first determining module 402, configured to determine visual positioning information respectively corresponding to a plurality of key image frames in the video;

a second determining module 403, configured to determine a capture pose transformation relationship between each of the key image frames according to inertial navigation information of the image sensor recorded when taking the video;

a graph optimization module 404, configured to perform, according to the visual positioning information corresponding to each of the plurality of key image frames, graph optimization processing on the visual positioning information corresponding to each of the plurality of key image frames by using the capture pose transformation relationship between each of the key image frames as an edge constraint; and a third determining module 405, configured to determine, according to a result of the graph optimization processing, a visual positioning result of the image sensor when taking the video.

In some embodiments, the first determining module 402 is configured to determine content information of each image frame in the video; select at least three key image frames that satisfy a preset condition from the video according to the content information of each image frame; and determine the visual positioning information corresponding to each of the at least three key image frames.

In some embodiments, the first determining module 402 is further configured to determine a selection indicator according to the content information of each image frame, the selection indicator including at least one of a content repeatability between each pair of two image frames, a content richness of each image frame, or image quality of each image frame; and select the at least three key image frames from the video according to the selection indicator.

In some embodiments, the first determining module 402 is configured to select the third image frame as one of the at least three key image frames when a content repeatability between the third image frame and other image frames in the video is less than a preset content repeatability threshold, and/or a content richness of the third image frame is greater than a preset content richness threshold, and/or image quality of the third image frame is greater than a preset image quality threshold.

In some embodiments, the graph optimization module 404 is configured to determine, in an electronic map, a local position region in which the image sensor is located according to the capture pose transformation relationship between each of the plurality of key image frames and the visual positioning information corresponding to each of the plurality of key image frames; determine updated visual positioning information of each of the plurality of key image frames relative to the local position region; determine at least one key image frame in the local position region according to the updated visual positioning information of each of the plurality of key image frame, and determine updated visual positioning information of the at least one key image frame in the local position region as to-be-determined visual positioning information; and perform graph optimization processing on the to-be-determined visual positioning information corresponding to each of the at least one key image frame in the local position region by using a capture pose transformation relationship between each of the at least one key image frame in the local position region as an edge constraint.

In some embodiments, the graph optimization module 404 is configured to select a key image frame from the at least three key image frames as a reference image frame, and determine remaining key image frames as other key image frames; perform coordinate transformation on visual positioning information corresponding to the other key image frames according to capture pose transformation relationships between the other key image frames and the reference image frame, to obtain relative visual positioning information of each of the other key image frames; cluster the visual positioning information corresponding to the reference image frame and the relative visual positioning information of each of the other key image frames; select at least two designated key image frames from the at least three key image frames according to a clustering result; and determine, in the electronic map, the local position region in which the image sensor is located according to visual positioning information corresponding to the selected designated key image frames.

In some embodiments, the graph optimization module 404 is configured to determine a positioning error according to the capture pose transformation relationship between each of the at least one key image frame in the local position region and the to-be-determined visual positioning information corresponding to each of the at least one key image frame in the local position region; and optimize the to-be-determined visual positioning information corresponding to each of the at least one key image frame in the local position region by using minimization of the positioning error as an optimization goal.

An embodiment in accordance with the present disclosure further provides a computer-readable storage medium storing a computer program, the computer program, when executed by a controller, causing the controller to implement the visual positioning method shown in FIG. 1.

Figure 5:
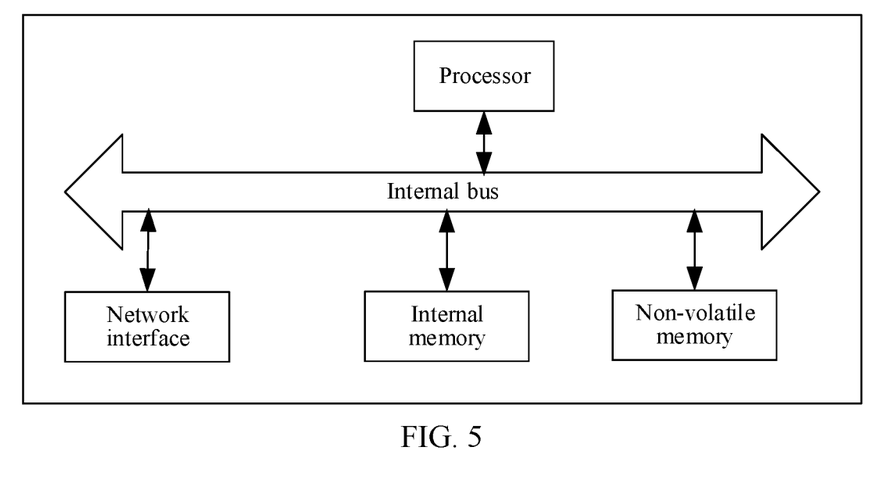
FIG. 5 is an exemplary schematic diagram of an unmanned device.

Based on the visual positioning method shown in FIG. 1, an embodiment of the present disclosure further proposes an unmanned device shown in FIG. 5. As shown in FIG. 5, at a hardware level, the unmanned device includes a processor, an internal bus, a network interface, an internal memory, and a non-volatile memory, and may certainly further include hardware required by other services. The processor reads the corresponding instruction from the non-volatile memory into the internal memory and then runs the instruction, so as to implement the visual positioning method shown in FIG. 1.

Certainly, in addition to a software implementation, the present disclosure does not exclude another implementation, such as a logic device, or a combination of software and hardware. In other words, the execution body of the following processing flow is not limited to each logic unit, or may be hardware or the logic device.

In the 1990s, improvements of a technology can be clearly distinguished as hardware improvements (for example, improvements to a circuit structure such as a diode, a transistor, or a switch) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (Programmable Logic Device, PLD) such as a field programmable gate array (Field Programmable Gate Array, FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Nowadays, instead of making an integrated circuit chip manually, the programming is mostly implemented by using "logic compiler" software, which is similar to the software compiler used to develop and write programs. The original code before compiling is also written in a specific programming language, which is referred to as a hardware description language (Hardware Description Language, HDL). There are many types of HDLs, such as advanced Boolean expression language (Advanced Boolean Expression Language, ABEL), altera hardware description language (Altera Hardware Description Language, AHDL), Confluence, Cornell university programming language (Cornell University Programming Language, CUPL), HDCal, Java hardware description language (Java Hardware Description Language, JHDL), Lava, Lola, MyHDL, PALASM, Ruby hardware description language (Ruby Hardware Description Language, RHDL), and the like. Currently, the most commonly used HDLs are very-high-speed integrated circuit hardware description language (Very-High-Speed Integrated Circuit Hardware Description Language, VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner. For example, the controller can take the form of, for example, a microprocessor or processor and a computer-readable medium storing computer-readable program code (for example, software or firmware) executable by the (micro) processor, a logic gate, a switch, an application specific integrated circuit (Application Specific Integrated Circuit, ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein configured to implement various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be specifically implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. In implementation of the present disclosure, the functions of the units may be integrated in the same piece of or a plurality of pieces of software and/or hardware to be implemented.

A person skilled in the art should understand that the embodiment of the present invention may be provided as a method, a system, or a computer program product. Therefore, the present disclosure may use a form of hardware-only embodiments, software-only embodiments, or embodiments combining software and hardware. In addition, the present disclosure may use a form of a computer program product implemented on one or more computer-usable storage media (including but not limited to a disk memory, a CD-ROM, an optical memory, and the like) including computer-usable program code.

The present disclosure is described with reference to the flowcharts and/or block diagrams of the method, the device (system), and the computer program product according to the embodiment of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computer device includes one or more processors (CPUs), an input/output interface, a network interface, and an internal memory.

The internal memory may include a form such as a volatile memory, a random-access memory (RAM) and/or a non-volatile memory in a computer-readable medium, such as a read-only memory (ROM) or a flash RAM (flash RAM). The internal memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer includes, but is not limited to, a phase-change memory (PRAM), a static random access memory (SRAM), a dynamic random access memory (DRAM), or other types of random access memory (RAM), a read-only memory (ROM), an electrically erasable programmable read-only memory (EEPROM), a flash memory or another storage technology, a compact disc read-only memory (CD-ROM), a digital versatile disc (DVD) or another optical storage, a cartridge tape, a magnetic tape, a magnetic disk storage or another magnetic storage device, or any other non-transmission medium, which may be configured to store information accessible by a computer device. According to limitations of this specification, the computer-readable medium does not include transitory computer-readable media (transitory media) such as a modulated data signal and a modulated carrier.

It should be further noted that the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an. . ." does not exclude other same elements existing in the process, the method, the article, or the device that includes the element.

The present disclosure can be described in the general context of computer-executable instructions executed by a computer, for example, a program module. Generally, the program module includes a routine, a program, an object, a component, a data structure, and the like for executing a particular task or implementing a particular abstract data type. The present disclosure can also be practiced in a distributed computing environment in which tasks are performed by remote processing devices that are connected through a communication network. In the distributed computing environment, the program module may be located in both local and remote computer storage media including storage devices.

The embodiments of the present disclosure are all described in a progressive manner, for same or similar parts in the embodiments, reference may be made to each other, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the present disclosure, and are not intended to limit the present disclosure. For a person skilled in the art, various modifications and variations can be made to the present disclosure. Any modification, equivalent replacement, or improvement made without departing from the spirit and principle of the present disclosure shall fall within the scope of the claims of the present disclosure.

The invention claimed is:

1. A vision positioning method, comprising:
acquiring a video captured by an image sensor;
determining visual positioning information respectively corresponding to a plurality of key image frames in the video;
determining a capture pose transformation relationship between each of the plurality of key image frames according to inertial navigation information of the image sensor recorded when taking the video;
performing, according to the visual positioning information corresponding to each of the plurality of key image frames, graph optimization processing on the visual positioning information corresponding to each of the plurality of key image frames by using the capture pose transformation relationship between each of the plurality of key image frames as an edge constraint; and
determining, according to a result of the graph optimization processing, a visual positioning result of the image sensor when taking the video.

2. The method according to claim 1, wherein determining the visual positioning information respectively corresponding to the plurality of key image frames in the video comprises:
determining content information of each image frame in the video;
selecting at least three key image frames that satisfy a preset condition from the video according to the content information of each image frame; and
determining the visual positioning information corresponding to each of the at least three key image frames.

3. The method according to claim 2, wherein selecting the at least three key image frames that satisfy the preset condition from the video according to the content information of each image frame comprises:
determining a selection indicator according to the content information of each image frame, the selection indicator comprising at least one of: a content repeatability between each pair of two image frames, a content richness of each image frame, or image quality of each image frame; and
selecting the at least three key image frames from the video according to the selection indicator.

4. The method according to claim 3, wherein the selection indicator is the content repeatability between each pair of two image frames, and determining the selection indicator according to the content information of each image frame comprises:
for each pair of two image frames, comparing the two image frames, and determining an image content overlapping region between the two image frames according to a result of the comparison; and
determining the content repeatability of the two image frames according to the image content overlapping region.

5. The method according to claim 3, wherein the video comprises a first image frame, the selection indicator is the content richness of each image frame, and determining the selection indicator according to the content information of each image frame comprises:
determining the content richness of the first image frame according to at least one of: a gradient, a texture, or a quantity of feature points of the first image frame.

6. The method according to claim 3, wherein the video comprises a second image frame, the selection indicator is the image quality of each image frame, and determining the selection indicator according to the content information of each image frame comprises:
determining the image quality of the second image frame according to at least one of: a gradient, a brightness, or a sharpness of the second image frame.

7. The method according to claim 3, wherein the video comprises a third image frame, and selecting the at least three key image frames that satisfy the preset condition from the video according to the content information of each image frame comprises:
selecting the third image frame as one of the at least three key image frames when a content repeatability between the third image frame and other image frames in the video is less than a preset content repeatability threshold, and/or a content richness of the third image frame is greater than a preset content richness threshold, and/or image quality of the third image frame is greater than a preset image quality threshold.

8. The method according to claim 2, wherein performing, according to the visual positioning information corresponding to each of the plurality of key image frames, the graph optimization processing on the visual positioning information corresponding to each of the plurality of key image frames by using the capture pose transformation relationship between each of the key image frames as the edge constraint comprises:
determining, in an electronic map, a local position region in which the image sensor is located according to the capture pose transformation relationship between each of the plurality of key image frames and the visual positioning information corresponding to each of the plurality of key image frames;
determining updated visual positioning information of each of the plurality of key image frames relative to the local position region;

determining at least one key image frame in the local position region according to the updated visual positioning information of each of the plurality of key image frames, and determining updated visual positioning information of the at least one key image frame in the local position region as to-be-determined visual positioning information; and performing graph optimization processing on the to-be-determined visual positioning information corresponding to each of the at least one key image frame in the local position region by using a capture pose transformation relationship between each of the at least one key image frame in the local position region as an edge constraint.

9. The method according to claim 8, wherein determining, in the electronic map, the local position region in which the image sensor is located according to the capture pose transformation relationship between each of the plurality of key image frames and the visual positioning information corresponding to each of the plurality of key image frames comprises:

selecting a key image frame from the at least three key image frames as a reference image frame, and determining remaining key image frames as other key image frames;

performing coordinate transformation on visual positioning information corresponding to the other key image frames according to capture pose transformation relationships between the other key image frames and the reference image frame, to obtain relative visual positioning information of each of the other key image frames;

clustering the visual positioning information corresponding to the reference image frame and the relative visual positioning information of each of the other key image frames;

selecting at least two designated key image frames from the at least three key image frames according to a clustering result; and determining, in the electronic map, the local position region in which the image sensor is located according to visual positioning information corresponding to the selected designated key image frames.

10. The method according to claim 8, wherein performing the graph optimization processing on the to-be-determined visual positioning information corresponding to each of the at least one key image frame in the local position region by using the capture pose transformation relationship between each of the at least one key image frame in the local position region as the edge constraint comprises:

determining a positioning error according to the capture pose transformation relationship between each of the at least one key image frame in the local position region and the to-be-determined visual positioning information corresponding to each of the at least one key image frame in the local position region; and optimizing the to-be-determined visual positioning information corresponding to each of the at least one key image frame in the local position region by using minimization of the positioning error as an optimization goal.

11. A non-volatile computer-readable storage medium, storing a computer program, the computer program, when executed by a controller, causing the controller to implement operations comprising:

acquiring a video captured by an image sensor;

determining visual positioning information respectively corresponding to a plurality of key image frames in the video;

determining a capture pose transformation relationship between each of the plurality of key image frames according to inertial navigation information of the image sensor recorded when taking the video;

performing, according to the visual positioning information corresponding to each of the plurality of key image frames, graph optimization processing on the visual positioning information corresponding to each of the plurality of key image frames by using the capture pose transformation relationship between each of the plurality of key image frames as an edge constraint; and determining, according to a result of the graph optimization processing, a visual positioning result of the image sensor when taking the video.

12. An unmanned device, comprising:

a processor; and a memory, configured to store an instruction executable by the processor, the instruction, when executed, causing the processor to implement operations comprising:

acquiring a video captured by an image sensor;

determining visual positioning information respectively corresponding to a plurality of key image frames in the video;

determining a capture pose transformation relationship between each of the plurality of key image frames according to inertial navigation information of the image sensor recorded when taking the video;

performing, according to the visual positioning information corresponding to each of the plurality of key image frames, graph optimization processing on the visual positioning information corresponding to each of the plurality of key image frames by using the capture pose transformation relationship between each of the plurality of key image frames as an edge constraint; and determining, according to a result of the graph optimization processing, a visual positioning result of the image sensor when taking the video.

* * * * *